(12) United States Patent
Mestha et al.

(10) Patent No.: US 6,584,435 B2
(45) Date of Patent: Jun. 24, 2003

(54) SYSTEMS AND METHODS FOR DETERMINING SPECTRA USING DYNAMIC KARHUNEN-LOEVE ALGORITHMS WITH MEASUREMENTS FROM LED COLOR SENSOR

(75) Inventors: Lingappa K. Mestha, Fairport, NY (US); Sohail A. Dianat, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 133 days.

(21) Appl. No.: 09/941,774

(22) Filed: Aug. 30, 2001

(65) Prior Publication Data

US 2003/0050768 A1 Mar. 13, 2003

(51) Int. Cl.$^7$ .............................................. G06F 3/00
(52) U.S. Cl. ......................... 702/196; 702/49; 702/66; 702/67; 702/189
(58) Field of Search .............................. 702/49, 66, 67, 702/75, 76, 115, 118, 120, 126, 134, 135, 171, 196, 189; 382/162; 356/402

(56) References Cited

U.S. PATENT DOCUMENTS

| | | | | |
|---|---|---|---|---|
| 3,910,701 A | | 10/1975 | Henderson et al. ............ 356/39 |
| 4,648,051 A | * | 3/1987 | Wandell et al. .............. 364/526 |
| 4,752,827 A | * | 6/1988 | Cassagne et al. ............ 358/141 |
| 5,137,364 A | | 8/1992 | McCarthy .................... 356/402 |
| 5,377,000 A | | 12/1994 | Berends ........................ 356/73 |
| 6,020,583 A | | 2/2000 | Walowit et al. .............. 250/226 |
| 6,118,903 A | * | 9/2000 | Liu ............................. 382/245 |
| 6,147,761 A | | 11/2000 | Walowit et al. .............. 356/425 |
| 6,157,469 A | * | 12/2000 | Mestha ........................ 358/504 |
| 6,178,007 B1 | | 1/2001 | Harrington .................. 358/1.9 |
| 6,373,568 B1 | * | 4/2002 | Miller et al. ................. 356/326 |
| 6,480,299 B1 | * | 11/2002 | Drakopoulos et al. ....... 358/1.9 |

* cited by examiner

Primary Examiner—Marc S. Hoff
Assistant Examiner—Felix Suarez
(74) Attorney, Agent, or Firm—Oliff & Berridge, PLC

(57) ABSTRACT

An LED-based spectrophotometer uses a reconstruction algorithm, based on the spectral characteristics of the illumination source and the color sensing system, to convert integrated multiple illuminant measurements from a non-fully illuminant populated color sensor into a fully populated spectral curve using a reference database. The reference database contains training samples that indicate reflectance spectra and their corresponding LED sensor output. A dynamic, Karhunen-Loeve-based (DKL) spectral reconstruction algorithm, used to reconstruct spectra, gives greater importance to the data from the training samples in the neighborhood of the color sample under measurement. This is done using linear operators and basis vectors.

26 Claims, 4 Drawing Sheets

SYSTEMS AND METHODS FOR DETERMINING SPECTRA USING DYNAMIC KARHUNEN-LOEVE ALGORITHMS WITH MEASUREMENTS FROM LED COLOR SENSOR

RELATED APPLICATIONS

Cross-reference and incorporation by reference is made to the following commonly assigned U.S. patent applications: U.S. application Ser. No. 09/941,858, filed on even date herewith, entitled SYSTEMS AND METHODS FOR DETERMINING SPECTRA USING DYNAMIC LEAST SQUARES ALGORITHMS WITH MEASUREMENTS FROM LED COLOR SENSOR, by Lingappa K. Mestha and Sohail A. Dianat; U.S. application Ser. No. 09/862,247; U.S. application Ser. No. 09/863,042; U.S. application Ser. No. 09/888,791; U.S. application Ser. No. 09/621,860; U.S. application Ser. No. 09/562,072; U.S. application Ser. No. 09/448,987; U.S. application Ser. No. 09/449,263; U.S. application Ser. No. 09/535,007; and U.S. application Ser. No. 09/862,945.

BACKGROUND OF THE INVENTION

1. Field of Invention

This invention relates to determining spectra based on non-spectral inputs.

2. Description of Related Art

Automatic on-line color calibration systems can be much more effective with an on-line color measurement system where a spectrophotometer may be mounted in the paper path of the moving copy sheets in the printer, preferably in the output path after fusing or drying, without having to otherwise modify the printer, or interfere with or interrupt normal printing, or the movement of the printed sheets in said paper path, and yet provide accurate color measurements of test color patches printed on the moving sheets as they pass the spectrophotometer. That enables a complete closed loop color control of a printer.

A typical spectrophotometer gives color information in terms of measured reflectances or transmittances of light, at the different wavelengths of light, from the test surface. This spectrophotometer desirably provides distinct electric signals corresponding to the different levels of reflected light received from the respective different illumination wavelength ranges or channels.

Known devices capable of providing distinct electric signals corresponding to the different levels of reflected light received from the respective different illumination wavelength ranges or channels include a grating-based spectrophotometer made by Ocean Optics Inc., LED based sensors marketed by "ColorSavvy" or Accuracy Microsensor; and other spectrophotometers by Gretag MacBeth (Viptronic), ExColor, and X-Rite (DTP41). However, those devices are believed to have significant cost, measurement time, target displacement errors, and/or other difficulties, for use in real-time printer on-line measurements.

As used herein, unless otherwise specifically indicated, the term "spectrophotometer" may encompass a spectrophotometer, colorimeter, and densitometer, as broadly defined herein. The definition or use of such above terms may vary or differ among various scientists and engineers. However, the following is an attempt to provide some simplified clarifications relating and distinguishing the respective terms "spectrophotometer," "colorimeter," and "densitometer," as they may be used in the specific context of specification examples of providing components for an on-line color printer color correction system, but not necessarily as claim limitations.

A typical "spectrophotometer" measures the reflectance of an illuminated object of interest over many light wavelengths. Typical prior spectrophotometers in this context use 16 or 32 channels measuring from 380 nm to 730 nm or so, to cover the humanly visible color spectra or wavelength range. A typical spectrophotometer gives color information in terms of measured reflectances or transmittances of light, at the different wavelengths of light, from the test surface. (This is to measure more closely to what the human eye would see as a combined image of a broad white light spectra image reflectance, but the spectrophotometer desirably provides distinct electrical signals corresponding to the different levels of reflected light from the respective different illumination wavelength ranges or channels.)

A "colorimeter" normally has three illumination channels, red, green and blue. That is, generally, a "colorimeter" provides its three (red, green and blue or "RGB") values as read by a light sensor or detector receiving reflected light from a color test surface sequentially illuminated with red, green and blue illuminators, such as three different color LEDs or one white light lamp with three different color filters. It may thus be considered different from, or a limited special case of, a "spectrophotometer," in that it provides output color information in the trichromatic quantity known as RGB.

Trichromatic quantities may be used for representing color in three coordinate space through some type of transformation. Other RGB conversions to "device independent color space" (i.e., RGB converted to conventional $L^*a^*b^*$) typically use a color conversion transformation equation or a "lookup table" system in a known manner.

A "densitometer" typically has only a single channel, and simply measures the amplitude of light reflectivity from the test surface, such as a developed toner test patch on a photoreceptor, at a selected angle over a range of wavelengths, which may be wide or narrow. A single illumination source, such as an IR LED, a visible LED, or an incandescent lamp, may be used. The output of the densitometer detector is programmed to give the optical density of the sample. A densitometer of this type is basically "color blind." For example, a cyan test patch and magenta test patch could have the same optical densities as seen by the densitometer, but, of course, exhibit different colors.

SUMMARY OF THE INVENTION

A multiple LED reflectance spectrophotometer, as in the examples of the embodiments herein, may be considered to belong to a special class of spectrophotometers which normally illuminate the target with narrow band or monochromatic light. Others, with wide band illumination sources, can be flashed Xenon lamp spectrophotometers, or incandescent lamp spectrophotometers. A spectrophotometer is normally programmed to give more detailed reflectance values by using more than 3 channel measurements (for example, 10 or more channel measurements), with conversion algorithms. That is in contrast to normal three channel calorimeters, which cannot give accurate, human eye related, reflectance spectra measurements, because they have insufficient measurements for that (only 3 measurements).

It is desirable for a printer color control system to dynamically measure the color of test patches on the printed output media "on line", that is, while the media is still in the sheet transport or paper path of a print engine, for real-time and fully automatic printer color correction applications.

For a low cost implementation of the color sensor, a multiple illuminant device is used as the illumination source, and has, for example, 8, 10, 12 or 16 LEDs. Each LED is selected to have a narrow band response curve in the spectral space. Therefore, for example, ten LEDs would correspond to ten measurements in the reflectance curve. The LEDs, or other multiple illuminant based color sensor equivalent, e.g., lasers, are switched on one at a time as, for example, the measured media is passed through a transport of a printer. The reflected light is then detected by a photodetector and the corresponding voltage integrated and normalized with a white tile.

To obtain a smooth curve similar to that of a Gretag spectrophotometer, linear or cubic spline algorithms could be used, which blindly interpolate the data points without the knowledge of the color space. Unfortunately, due to lack of measurements at wavelengths below 430 nm and above 660 nm (due to lack of LEDs at these wavelengths), extrapolation with 10 measurements can lead to errors.

The systems and methods of this invention use the integrated sensor measurements to determine a fully populated reflectance spectra with reflectance values at specific wavelengths, even though some of the light sources may not produce spectral content at the distant ends of the visible spectrum. By using a reconstruction algorithm, based on the spectral characteristics of the illumination source and the color sensing system, the integrated multiple illuminant measurements from a non-fully illuminant populated color sensor are converted into a fully populated spectral curve.

Algorithms according to this invention utilize a reference database that contains training samples that indicate reflectance spectra and their corresponding LED sensor output. A dynamic, Karhunen-Loeve-based (DKL) spectral reconstruction algorithm is used to reconstruct spectra. The algorithm is "dynamic" because it gives greater importance to the data from the training samples in the neighborhood of the color sample under measurement. This is done using linear operators and basis vectors.

These and other objects, advantages and salient features of the invention are described in or apparent from the following description of exemplary embodiments.

BRIEF DESCRIPTION OF THE DRAWINGS

Exemplary embodiments of the invention will be described with reference to the drawings, wherein like numerals represent like parts, and wherein.

DETAILED DESCRIPTION OF PREFERRED EMBODIMENTS

Figure 1:
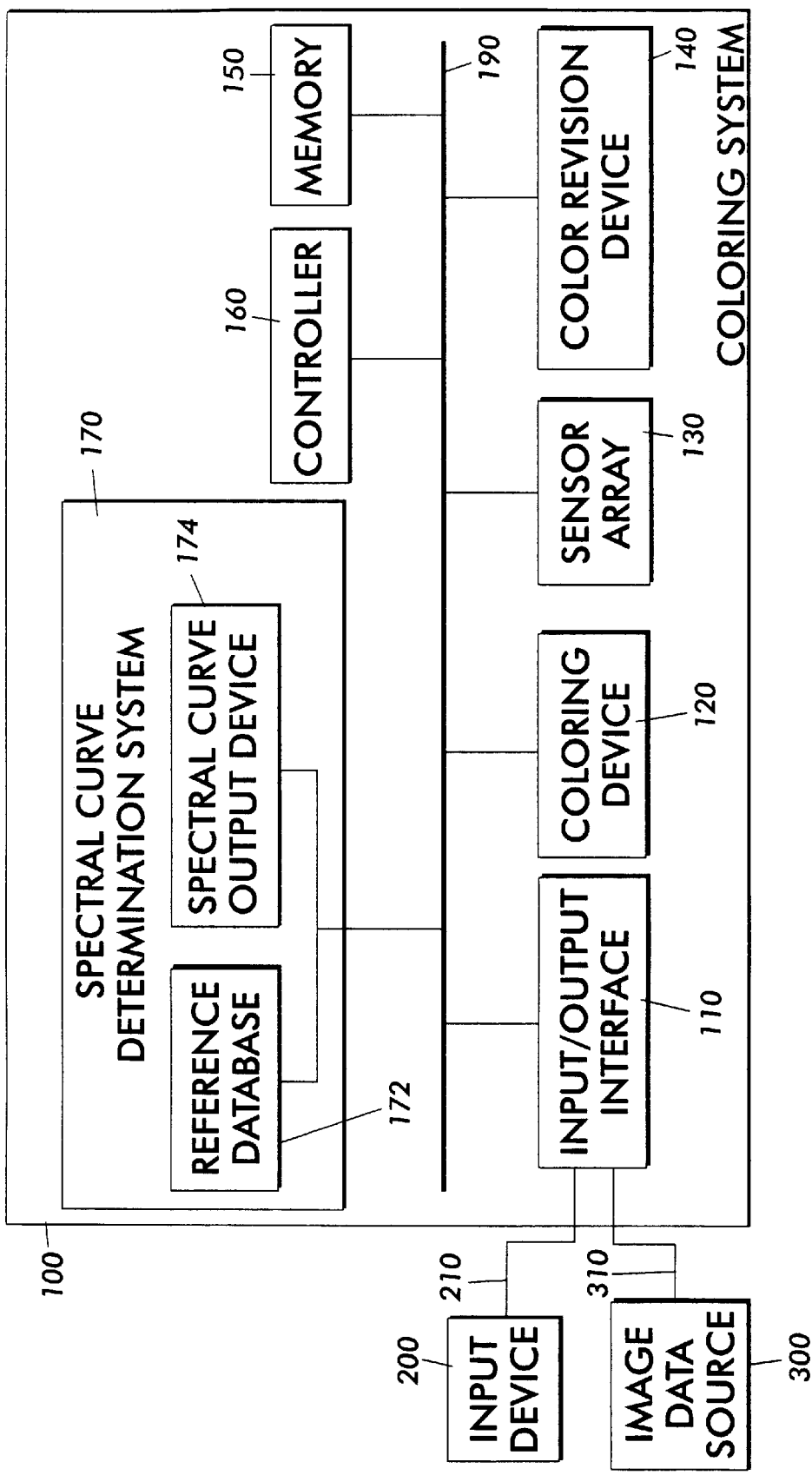
FIG. 1 is a functional block diagram illustrating an exemplary embodiment of a coloring system according to the invention.

The spectrophotometer of the disclosed embodiment is a spectrophotometer especially suitable for being mounted at one side of the printed sheets output path of a color printer to optically evaluate color imprinted output sheets as they move past the spectrophotometer, variably spaced therefrom, without having to contact the sheets or interfere with the normal movement of the sheets. In particular, it may be used to measure a number of color test patch samples printed by the printer on actual printed sheet output of the printer during regular or selected printer operation intervals (between normal printing runs or print jobs). These color test sheet printing intervals may be at regular timed intervals, and/or at each machine "cycle-up," or as otherwise directed by the system software. The spectrophotometer may be mounted at one side of the paper path of the machine, or, if it is desired to use duplex color test sheets, two spectrophotometers may be mounted on opposite sides of the paper path.

Relatively frequent color calibration of a color printer is highly desirable, since the colors actually printed on the output media (as compared to the colors intended to be printed) can significantly change, or drift out of calibration over time, for various known reasons. For example, changes in the selected or loaded print media, such as differences paper or plastic sheet types, materials, weights, calendaring, coating, humidity, etc., or changes in the printer's ambient conditions, changes in the image developer materials, aging or wear of printer components, varying interactions of different colors being printed, etc. Printing test color patches on test sheets of the same print media under the same printing conditions during the same relative time periods as the color print job being color-controlled is thus very desirable.

It is thus also advantageous to provide dual-mode color test sheets, in which multiple color patches of different colors are printed on otherwise blank areas of each, or selected, banner, cover, or other inter-document or print job separator sheets. Different sets of colors may be printed on different banner or other test sheets. This dual use of such sheets saves both print paper and printer utilization time, and also provides frequent color calibration opportunities where the printing system is one in which banner sheets are being printed at frequent intervals anyway.

An additional feature which can be provided is to tailor or set the particular colors or combinations of the test patches on a particular banner or other test sheet to those colors which are about to be printed on the specific document for that banner sheet, i.e., the document pages which are to be printed immediately subsequent to that banner sheet (the print job identified by that banner sheet). This can provide a "real time" color correction for the color printer which is tailored to correct printing of the colors of the very next document to be printed.

The preferred implementations of the systems and features disclosed herein may vary depending on the situation. Also, various of the disclosed features or components may be alternatively used for such functions as gray scale balancing, turning on more than one illumination source at once, such as oppositely positioned LEDs, etc.

It will be appreciated that these test patch images and colors may be automatically sent to the printer imager from a stored data file specifically designed for printing the dual mode banner sheet or other color test sheet page, and/or they may be embedded inside the customer job containing the banner page. That is, the latter may be directly electronically associated with the electronic document to be printed, and/or generated or transmitted by the document author or sender. Because the printed test sheet color patches colors and their printing sequence is known (and stored) information, the on-line spectrophotometer measurement data therefrom can be automatically coordinated and compared.

After the spectrophotometer or other color sensor reads the colors of the test patches, the measured color signals may be automatically processed inside the system controller or the printer controller to produce or modify the tone reproduction curve, as explained in the cited references. The color test patches on the next test sheet may then be printed with that new tone reproduction curve. This process may be repeated so as to generate further corrected tone reproduction curves. If the printer's color image printing components and materials are relatively stable, with only relatively slow long term drift, and there is not a print media or other abrupt change, the tone reproduction curve produced using this closed loop control system will be the correct curve for achieving consistent colors for at least one or even a substantial number of customer print jobs printed thereafter, and only relatively infrequent and few color test sheets, such as the normal banner sheets, need be printed.

In addition to use in printers, it should be noted that color measurements, and/or the use of color measurements for various quality or consistency control functions, are also important for many other different technologies and applications, such as in the production of textiles, wallpaper, plastics, paint, inks, food products, etc. and in the measurement or detection of various properties of various materials, objects or substances. Thus, the invention may have applications in various such other fields where these materials, objects or substances are to be color tested, including both (1) applications in which color measurements are taken and applied in a closed loop control system and (2) applications in which the measurement result is not fed back into a control loop, but is used to generate a one-time output.

FIG. 1 is a functional block diagram illustrating an exemplary embodiment of a coloring system 100 according to this invention. The coloring system 100 is connected to an input device 200 via a link 210. The input device 200 inputs various information needed to implement the operations of the coloring system 100, as described in more detail below, and may include a mouse, a keyboard, a touch-screen input device, a voice recognition-based input device, and/or any other known or later developed device usable for inputting information. The coloring system 100 optionally is connected to an image data source 300 via a link 310. The connection to the image data source 300 is "optional" because it is required only for certain embodiments of the coloring system 100.

For example, when the coloring system 100 is a marking device, such as a printer, the image data source 300 is required. However, when the coloring system 100 is a system for performing a coloring operation that does not require image data, the image data source 300 is not required. An example of a coloring operation that may not require image data is an operation of making a colored food product such as cereal or the like.

The image data source 300 can be a digital camera, a scanner, or a locally or remotely located computer, or any other known or later developed device that is capable of generating electronic image data. Similarly, the image data source 300 can be any suitable device that stores and/or transmits electronic image data, such as a client or a server of a network. The image data source 300 can be integrated with the coloring system 100, as in a digital copier having an integrated scanner. Alternatively, the image data source 300 can be connected to the coloring system 100 over a connection device, such as a modem, a local area network, a wide area network, an intranet, the Internet, any other distributed processing network, or any other known or later developed connection device.

It should also be appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source 300 is thus any known or later developed device which is capable of supplying electronic image data over the link 310 to the coloring system 100. The link 310 can thus be any known or later developed system or device for transmitting the electronic image data from the image data source 300 to the coloring system 100.

Further, it should be appreciated that the links 210 and 310 can be a wired, wireless or optical link to a network (not shown). The network can be a local area network, a wide area network, an intranet, the Internet, or any other distributed processing and storage network.

The coloring system 100 includes a coloring device 120, a sensor array 130, a color revision device 140, a memory 150, a controller 160 and a spectral curve determination system 170, which are interconnected by a data/control bus 190. The spectral curve determination system 170 includes a reference database 172 and a spectral curve output device 174.

The coloring device 120 may be, for example, a print engine/printing head or marking engine/marking head, when the coloring system 100 is a printer or other marking device. The coloring device 120 may be, for example, a colorant dispenser that dispenses a colorant onto an object or into a mixture. In short, the coloring device 120 may be any known or later developed device that directly or indirectly controls the final appearance of an object, material or substance.

The sensor array 130 includes multiple illuminants, such as LEDs, lasers or the like, arranged around a central photodetector (not shown), or arranged in correspondence to a plurality of photodetectors or photosites as described in above-mentioned co-pending U.S. application Ser. No. 09/862,247, U.S. application Ser. No. 09/863,042, and/or U.S. application Ser. No. 09/888,791. The illuminants will be referred to hereafter as LEDs for convenience. The number of LEDs may be any number greater than three, when a single photosensor is used, or may be as low as two when multiple photosites or photosensors are used. A larger number of LEDs gives greater accuracy, but it costs more to include more LEDs, and thus there are practical limits to the number of LEDs included in the sensor array 130, especially since an object of this invention is to provide a low-cost spectrophotometer. Therefore, the number of LEDs is preferably from about 8 to about 16.

Each LED is selected to have a narrow band response curve in the spectral space. Therefore, for example, ten LEDs would correspond to ten measurements in the reflectance curve. The LEDs, or other multiple illuminant based color sensor equivalent, e.g., lasers, are switched on one at a time as, for example, the measured media is passed through a transport of a printer. The reflected light is then detected by the photodetector and the corresponding voltage integrated and normalized with a white tile. The normalization may be performed periodically. For the normalization, use of a white tile calibration look-up table, which is stored in memory 150, is a standard practice in the color measurement industry. When the white tile calibration look-up table is used, the detector output is normalized to between 0 to 1 in accordance with the following equation:

$$V_{m_i} = (VV_i^o)R_i^w/(V_i^{fs} - V_i^o), \quad (1)$$

where $V_i^o$ is the black measurement sensing system offset of the $i^{th}$ LED, $V_i^{fs}$ is the white tile measurements, $V_i$ is the sensor detector output, and $R_i^w$ is the reflectance spectra of the white tile at the mean wavelength of the $i^{th}$ LED. Any other known or later developed method for normalization may alternatively be used. $V_{m_i}$ may be compensated for temperature variation.

The color revision device 140 calibrates the output of the coloring device 120 in accordance with information obtained from the spectral curve output device 174 of the spectral curve determination system 170. This calibration may be performed as often as necessary or desired to maintain a desirable output of the coloring device 120.

The memory 150 may serve as a buffer for information coming into or going out of the coloring system 100, may store any necessary programs and/or data for implementing the functions of the coloring system 100, and/or may store data at various stages of processing. The above-mentioned white tile lookup table may be stored in the memory 150 if desired. The reference database 172, described in more detail below, may also be stored in the memory 150 if desired. Furthermore, it should be appreciated that the memory 150, while depicted as a single entity, may actually be distributed. Alterable portions of the memory 150 are, in various exemplary embodiments, implemented using static or dynamic RAM. However, the memory 150 can also be implemented using a floppy disk and disk drive, a writeable optical disk and disk drive, a hard drive, flash memory or the like. The generally static portions of the memory 150 are, in various exemplary embodiments, implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

The controller 160 controls the operation of other components of the coloring system 100, performs any necessary calculations and executes any necessary programs for implementing the processes of the coloring system 100 and its individual components, and controls the flow of data between other components of the coloring system 100 as needed.

The spectral curve determination system 170 determines and outputs spectral curves. Specifically, the spectral curve output device 174 outputs spectral curves based on a plurality of spectra which are determined by the controller 160 based on information from the reference database 172, described in more detail below, and the output of the sensor array 130 from different color targets.

To obtain an output similar to that of a reference spectrophotometer, such as a Gretag spectrophotometer, it is necessary to convert the readings from the sensory array 130 to reflectance spectra. A Gretag spectrophotometer outputs 36 spectral reflectance values, evenly spaced at 10 nm over the visible spectrum (e.g., 380 nm to 730 nm). Therefore, in the following examples, the readings from the sensor array 130 are converted to 36 reflectance values. In other words, when there are 10 LEDs in the sensor array 130, the LEDs are sequentially switched, readings (typically voltage readings) are collected from the photodetector for each respective LED, and the 10 readings (voltages) from the sensor array 130 are converted to 36 reflectance values per color. If a multiple photosite sensor is used, it will be appreciated that a desired number of outputs, for example 10 outputs, will be obtained from smaller number of LEDs, for example 3 or 4 LEDs.

The reference database 172 is generated by measuring the reflectance spectra of some set of reference colors, with an accurate reference spectrophotomer, such as a Gretag spectrophotometer, and their corresponding LED sensor outputs, with the sensor array 130. In general, the more densely populated the database is, i.e., the more reference colors used, the better the resulting accuracy. In one exemplary reference database, about 2000 pantone colors were used. Furthermore, even spacing of the reference colors in the color space gives greater accuracy. The data stored in the reference database 172 will be referred to hereafter as the training samples.

It should be understood that each of the circuits shown in FIG. 1 can be implemented as portions of a suitably programmed general purpose computer. Alternatively, each of the circuits shown in FIG. 1 can be implemented as physically distinct hardware circuits within an ASIC, or using a FPGA, a PDL, a PLA or a PAL, or using discrete logic elements or discrete circuit elements. The particular form each of the circuits shown in FIG. 1 will take is a design choice and will be obvious and predictable to those skilled in the art.

An exemplary algorithm that may be implemented by the controller 160 for determining spectra based on the reference database 172 and the output of the sensor array 130 is described below. The following algorithm is a dynamic, Karhunen-Loeve-based spectral reconstruction algorithm, hereafter referred to as a DKL algorithm. One characteristic of the DKL algorithm is that, in the determination of spectra, greater importance is given to the data from the training samples in the neighborhood of the color sample under measurement. This is done using linear operators and basis vectors.

In the following description, the number of LEDs included in the sensor array 130 is assumed to be 10. Those skilled in the art will appreciate how to apply the algorithm to sensor arrays with more or fewer LEDs.

Furthermore, it should be appreciated in this context that, in general, algorithms applicable to generation of a tone reproduction curve are not applicable to generation of a spectral curve. One reason for this is that, while the first and last values in a tone reproduction curve are known (i.e., they are [0,0] and [255, 255]), the same cannot be said of spectral curves generated using LED sensors, because the LEDs at the opposite ends of the spectrum (i.e., the blue and red LEDs) are not monochromatic.

The sensor transfer function is a mapping from reflectance spectra (as measured by a reference spectrophotometer) to sensor outputs (as measured by the sensor array 130) formed by a set of N spectra to voltage measurements, denoted as $$\Omega = [S_1 S_2 \ldots S_N] \in R^{n \times N} \rightarrow Z = [Z_1 Z_2 \ldots Z_N] \in R^{l \times N} \quad (2)$$

where $S_1 S_2 \ldots S_N$ are the vector elements containing the N spectral curves, each curve containing 36 elements, i.e., reflectance values (n=36), and $Z_1 Z_2 \ldots Z_N$ are the vector elements from the LED sensor outputs (in volts), each having ten components (l=10) when a 10-LED spectrophotomer is used. Here, each curve contains 36 elements because a Gretag spectrophotometer, which outputs 36 values, is used. If a different spectrophotometer is used which has a different number of outputs, n will be a correspondingly different number. $Z_1 Z_2 \ldots Z_N$ are each a vector including 10 normalized voltages corresponding to the 10 LED color sensor outputs for a given color. R indicates the set of real numbers. N is a predetermined number based on certain color gamut specifications for the color sensor array 130. Generally, the larger the gamut, the larger will be N. As an example, N may be about 2000.

The value of l discussed above depends on the number of sensor outputs. It will be appreciated that when a multiple photosite sensor is used, l will not be equal to the number of LEDs.

Given $V_m$, which represents the set of 10 LED sensor voltages corresponding to an unknown color with true spectrum S, a goal of the algorithm is to obtain an estimate of the unknown, true color spectrum S. The relationship between Karhunen-Loeve (KL) transform coefficient vector α and LED outputs may be assumed to be linear except for an offset, and thus may be expressed as $$\alpha = AV \quad (3)$$

where $V=[V_m 1]$ is an 11×1 vector for a linear affine model with 10 LEDs in the sensor array 130. V is a vector formed by augmenting the normalized $V_m$ voltage vector with scalar value 1. Thus, for example, if 12 LEDs were used in the sensor array 130, V would be a 13×1 vector for a linear affine model. A is an unknown conversion matrix of size 36×11 for a 10 LED sensor and a linear affine model. Those skilled in the art will appreciate that, if quadratic or other terms are included, then the number of elements in vector V and matrix A correspondingly increase to greater than 11×1 and 36×11 respectively. For example, if a quadratic term is included, then the number of elements in vector V will be 66×1 and the number of elements in matrix A will be 36×66.

For the DKL algorithm, the reference database 172 is a mapping from the KL transform coefficients, which correspond to the reference spectra $S_1, S_2 \ldots S_N$, to the sensor voltages $Z_1 Z_2 \ldots Z_N$. Thus, the reference database 172 may be expressed as $$[\alpha_1 \alpha_2 \ldots \alpha_N] \in R^{n \times N} \rightarrow [Z_1 Z_2 \ldots Z_N] \in R^{l \times N} \quad (4)$$

Here, $\alpha_1 \alpha_2 \ldots \alpha_N$ are KL transform coefficient vectors corresponding to $S_1 S_2 \ldots S_N$.

To compute matrix A optimally for obtaining an estimated spectrum Ŝ for a color measured by sensor array 130, whose output is the augmented vector $V=[V_m 1]$, a weighted least square criteria is used. The optimal solution for matrix A, called A*, is obtained by minimizing the objective function defined as $$A^* = \underset{A}{\operatorname{argmin}} J = \underset{A}{\operatorname{argmin}} \sum_{i=1}^{N} w(i) \|\alpha_i - AZ_i\|^2 \quad (5)$$

where $$w(i) = \frac{1}{d(i)^p + \varepsilon}; \, d(i) = \|V - Z_i\| \quad (6)$$

p is an integer number greater than or equal to 2, and ε is a small positive constant. i represents the index for training samples from the reference database $(S_i, Z_i)$. Appropriate values for p and ε may be empirically determined. Examples of appropriate values chosen for an 8- or 10-LED sensor are p=4 and ε=1×10⁻⁵. The solution to the above optimization problem can be easily obtained by setting the gradient of J with respect to A equal to zero. This results in $$A^* = QP^{-1} \quad (7)$$

where $$Q = \sum_{i=1}^{N} w(i) \alpha_i Z_i^T \quad (8)$$

and $$P = \sum_{i=1}^{N} w(i) Z_i Z_i^T \quad (9)$$

Once A* is computed, an estimated value α̂ of the parameter vector α can be estimated by $$\hat{\alpha} = A^* V \quad (10)$$

The estimated spectrum Ŝ for the target color measured by the sensor array 130 can be obtained by $$\hat{S} = \hat{\alpha}^T \phi \quad (11)$$

where ø is a matrix of basis function vectors obtained using the KL transform of reference spectra $S_1 S_2 \ldots S_N$. Techniques for computing basis function vectors and KL transform coefficient vectors are well known by those skilled in the art.

The foregoing algorithm determines one spectrum, obtained from one target color under measurement. If spectral curves are to be generated for a plurality of target colors, then matrix A* is computed for the plurality of target colors, using equations (5)–(11) for each color with corresponding V vector.

Figure 2:
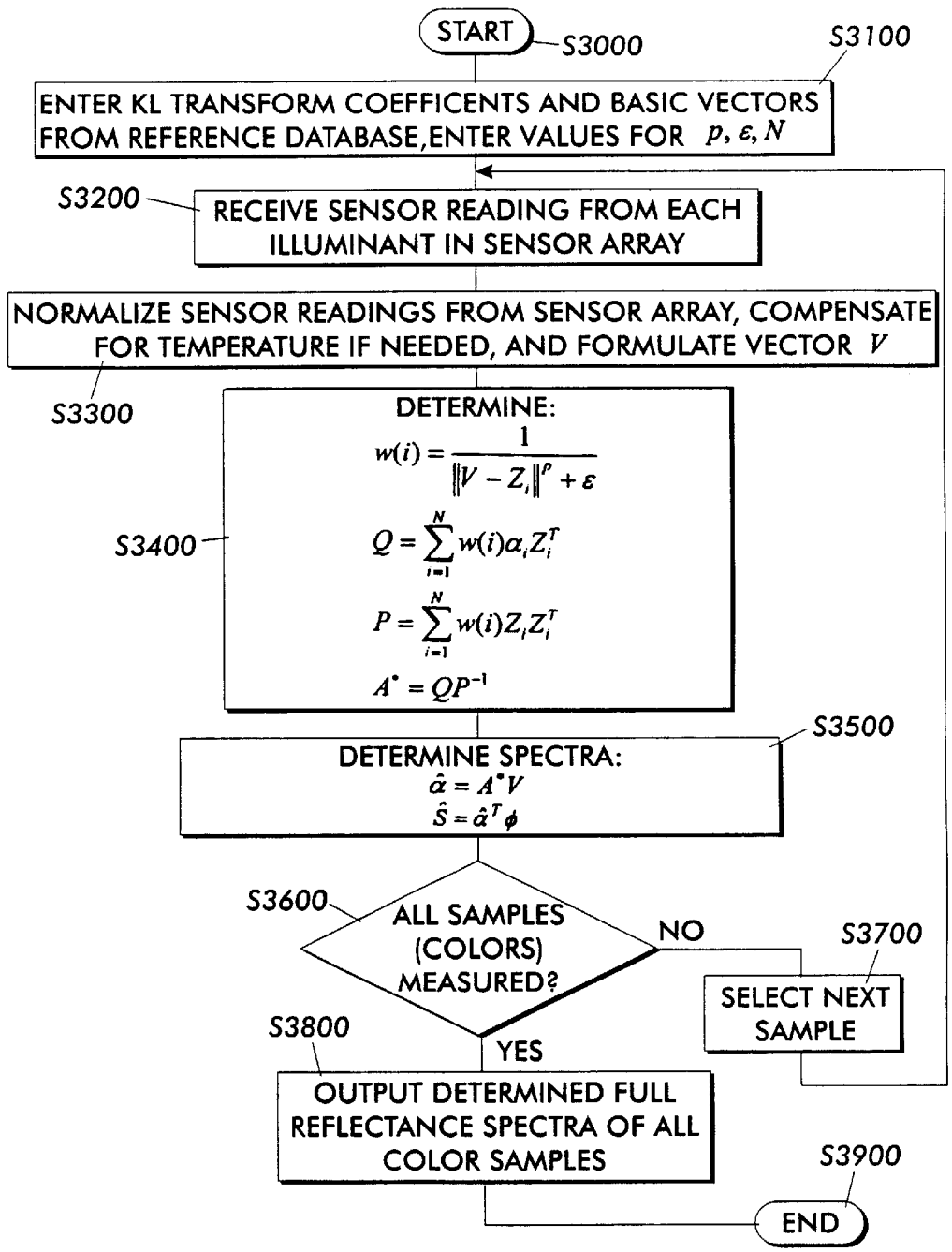
FIG. 2 is a flowchart illustrating a first exemplary method of determining spectra according to this invention.

FIG. 2 is a flowchart illustrating a first exemplary method of determining spectra according to this invention. Beginning in step S3000, the process continues to step S3100, where training samples are entered from a reference database, and appropriate values are entered for p, ε and N. The process then continues to step S3200 and receives a sensor reading, such as a sensor voltage, from each illuminant in a sensor array. Continuing to step S3300, the process determines V by normalizing the sensor readings obtained from the sensor array, e.g., based on a white tile calibration look-up table.

Next, in step S3400, the process determines matrix A* in accordance with the algorithm described above. The process then continues to step S3500, where a spectra is determined. This step is accomplished by determining α̂=A*V, and determining the spectra as Ŝ=α̂ᵀø. Continuing to step S3600, it is determined whether all color samples have been measured. If not all the color samples have been measured, the process continues to step S3700. Otherwise, the process jumps to step S3800.

In step S3700, the next color sample is selected. Steps S3200–S3600 are then repeated. When all color samples have been measured, the process goes to step S3800 and outputs the full reflectance spectra, i.e., the spectral curve, of the color samples. Finally, the process ends in step S3900.

One disadvantage of the above-described algorithm is computational complexity due to the need for a matrix inversion, seen in the step of determining $A^* = QP^{-1}$, every time a new spectrum is required for each color measured by the sensor array 130. Matrix inversion is time consuming and can even be an ill posed problem, since P and $P^{-1}$ must be positive definite matrices. A modified DKL algorithm which overcomes this problem is described below.

Figure 3:
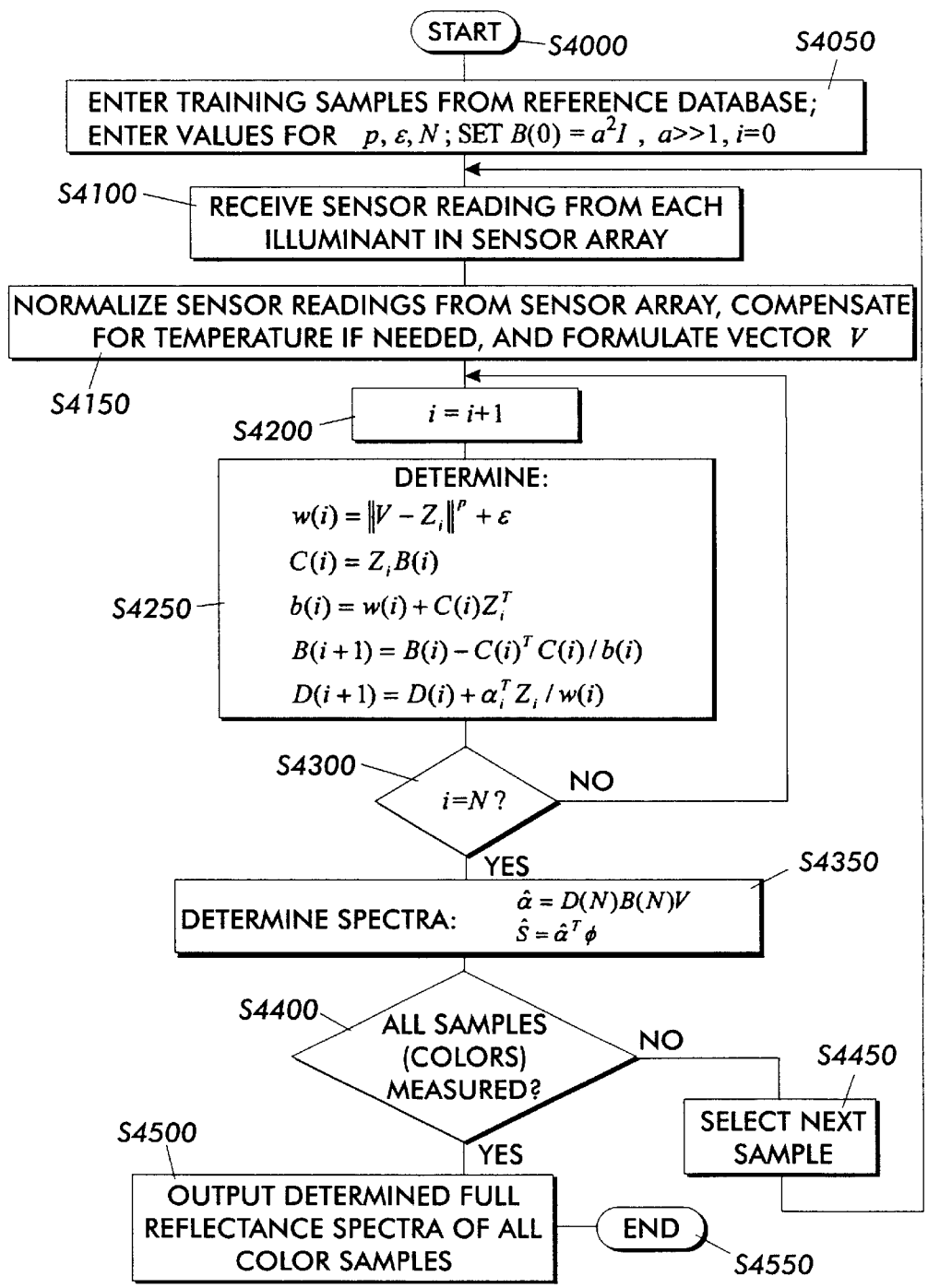
FIG. 3 is a flowchart illustrating a second exemplary method of determining spectra according to this invention.

FIG. 3 is a flowchart illustrating a second exemplary method of determining spectra according to this invention. Beginning in step S4000, the process continues to step S4050, where N training samples are entered from a reference database, and appropriate values are entered for p, ϵ and N. Additionally, B(0) is set at $\alpha^2 I$, where $\alpha \gg 1$ and I is the identity matrix of size 11×11 for a 10-LED sensor, D(0) is a zero matrix of size 36×11, and i, the index of recursive iteration, is set at 0. An appropriate value for $\alpha$ may be determined empirically. An example of an appropriate value for $\alpha$ is $1 \times 10^5$.

The process then continues to step S4100 and receives a sensor reading, such as a sensor voltage, from each illuminant in a sensor array. Continuing to step S4150, the process determines V by normalizing the sensor readings obtained from the sensor array, e.g., based on a white tile calibration look-up table. The process then continues to step S4200.

In step S4200, the process sets i=i+1, and then continues to step S4250. In step S4250, the process computes B(i+1) and D(i+1) as shown, where B(i) is an 11×11 matrix and D(i) is a 36×11 matrix, for a 10 LED sensor. The process then continues to step S4300 and determines whether i=N. If i=N, the process continues to step S4350. Otherwise, the process returns to step S4200. Thus, the process performs a recursive loop until i=N.

In step S4350, an estimated spectrum is determined. This step is accomplished by determining $\hat{\alpha}=D(N)B(N)V$, and determining the estimated spectrum as $\hat{S}=\hat{\alpha}^T \phi$. Continuing to step S4400, it is determined whether all color samples have been measured. If not all the color samples have been measured, the process continues to step S4450. Otherwise, the process jumps to step S4500.

In step S4450, the next color sample is selected. Steps S4100–S4400 are then repeated. When all color samples have been measured, the process goes to step S4500 and outputs the full reflectance spectra, i.e., the spectral curve, of the color samples. Finally, the process ends in step S4550.

As seen above, the method of FIG. 3 does not require a matrix inversion. However, the method of FIG. 3 does require a recursive loop, which increases the processing time. Thus, for some applications, the method of FIG. 2 may be preferred over the method of FIG. 3, while for other applications, the method of FIG. 3 may be preferred over the method of FIG. 2. Those skilled in the art will be able to determine which method is more suitable for a given application.

Figure 4:
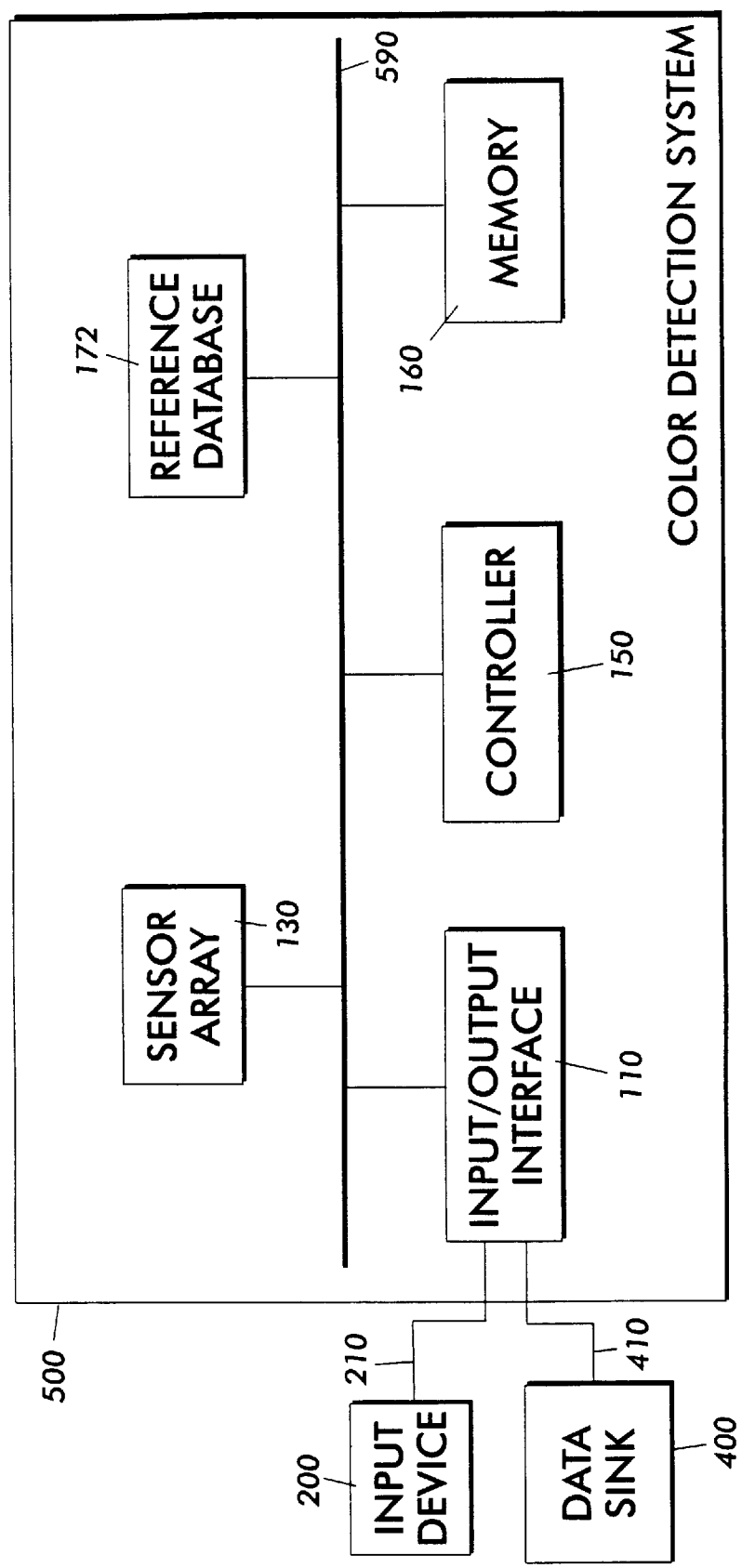
FIG. 4 is a functional block diagram illustrating an exemplary embodiment of a color detection system according to this invention.

FIG. 4 is a functional block diagram illustrating an exemplary embodiment of a color detection system 500 according to this invention. The color detection system 500 includes an input/output interface 110, a sensor array 130, a controller 150, a memory 160 and a reference database 172, which may be identical to the corresponding elements of FIG. 1, interconnected by a data/control bus 590. The color detection system 500 is connected to a user input device 200 via a link 210, similar to the input device 200 and link 210 described above in conjunction with FIG. 1. The color detection system 500 is also connected to a data sink 400 via a link 410 which, like the links 210 and 310, can be a wired, wireless or optical link to a network (not shown). In general, the data sink 400 can be any device that is capable of outputting or storing the processed data generated by the color detection system, such as a printer, a copier or other image forming devices, a facsimile device, a display device, a memory, or the like.

The color detection system 500 may be, or be included in, a portable or stationary unit designed specifically to measure color of a target object. In use, the color detection system 500 is positioned with the sensor array 130 facing the target object, the sensor array 130 is activated as described above, and then the above-described algorithm is executed by the controller 150, using data from the sensor array 130 and the reference database 172, to obtain an estimated spectrum $\hat{S}$ of the target object. The estimated spectrum $\hat{S}$ is then output to the data sink 400.

From the foregoing descriptions, it can be appreciated that, in embodiments, the invention may provide a calibration tool for scanners, printers, digital photocopiers, etc., and that, in embodiments, the invention may provide a color measurement tool designed to provide one-time color measurements of target objects.

The coloring system 100 of FIG. 1 and the color detection system 500 of FIG. 4 are preferably implemented either on a single program general purpose computer or separate programmed general purpose computer, with an associated sensor array 130 (and coloring device 120, in the case of FIG. 1). However, the coloring system 100 and color detection system 500 can also be implemented on a special purpose computer, a programmed micro-processor or microcontroller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowcharts shown in FIGS. 2–3, or appropriate portions thereof, can be used to implement the spectral curve reconstruction device according to this invention.

Furthermore, the disclosed methods may be readily implemented in software using object or object-oriented software development environments that provide portable source code that can be used on a variety of computer or workstation hardware platforms. Alternatively, appropriate portions of the disclosed coloring system 100 and the color detection system 500 may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The processing systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer or as a resource residing on a server or workstation, such as a routine embedded in a photocopier, a color photocopier, a printer driver, a scanner, or the like. The systems and methods can also be implemented by physical incorporation into a software and/or hardware system, such as the hardware and software system of a photocopier or a dedicated image processing system.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

What is claimed is:

1. A method of determining a reflectance spectrum, comprising:

obtaining a normalized value from a plurality of illuminant sensor outputs, each illuminant sensor output indicating a reflectance value obtained from a target;

obtaining reference data from a reference database that correlates Karhunen-Loeve coefficients of reference spectra with a corresponding plurality of normalized illuminant sensor outputs for reference colors, the reference data including data in a neighborhood of each reflectance value; and determining a spectrum $\hat{S}$ based on the illuminant sensor outputs and the reference data, wherein the determining step places greater importance on the data in the neighborhood of each reflectance value.

2. The method according to claim 1, wherein the determining step is performed based on basis vectors and linear operators.

3. The method of claim 2, wherein the linear operators include a conversion matrix, and the determining step estimates a parameter vector $\hat{\alpha}$ by multiplying a matrix of the basis vectors by the conversion matrix and estimates the spectrum $\hat{S}$ by $$\hat{S}=\hat{\alpha}^T\varnothing,$$

where $\varnothing$ is the matrix of the basis function vectors corresponding to a Karhunen-Loeve transform of reference reflectance spectra represented by $S_1 S_2 \ldots S_N$.

4. The method of claim 3, wherein the conversion matrix is represented by $$A^*=QP^{-1}$$

where $$Q = \sum_{i=1}^{N} w(i)\alpha_i Z_i^T \text{ and } P = \sum_{i=1}^{N} w(i) Z_i Z_i^T$$

where w(i) represents a weighting function that places greater importance on the data in the neighborhood of each actual reflectance value, N is a number of spectral samples in the reference database, $\alpha_i$ is an $i^{th}$ Karhunen-Loeve transform coefficient vector in the reference database, and $Z_i$ is an $i^{th}$ normalized illuminant sensor output in the reference database.

5. The method of claim 4, wherein $$w(i) = \frac{1}{\|V - Z_i\|^p + \varepsilon},$$

where p is an integer number greater than or equal to 2 and $\epsilon$ is a small positive constant.

6. The method of claim 2, wherein the linear operators include $$C(i)=Z_i B(i)$$

$$b(i)=w(i)+C(i)Z_i^T$$

$$B(i+1)=B(i)-C(i)^T C(i)/b(i)$$

$$D(i+1)=D(i)+\alpha_i^T Z_i/w(i)$$

where w(i) represents a weighting function that places greater importance on the data in the neighborhood of each actual reflectance value, $\alpha_i$ is an $i^{th}$ Karhunen-Loeve transform coefficient vector in the reference database, and $Z_i$ is an $i^{th}$ normalized illuminant sensor output in the reference database, the linear operators being recursively computed until i=N, where N is a number of spectral samples in the reference database;

wherein the determining step estimates a parameter vector $\hat{\alpha}$ by $$\hat{\alpha}=D(N)B(N)V$$

and estimates the spectra $\hat{S}$ by $$\hat{S}=\hat{\alpha}^T\varnothing,$$

where $\varnothing$ is a matrix of the basis function vectors corresponding to a Karhunen-Loeve transform of reference reflectance spectra represented by $S_1 S_2 \ldots S_N$.

7. The method of claim 6, wherein w(i)=$\|V-Z_i\|^p+\epsilon$, where p is an integer number greater than or equal to 2 and $\epsilon$ is a small positive constant.

8. The method of claim 2, wherein the determining step avoids a recursive loop by including a matrix inversion.

9. The method of claim 2, wherein the determining step avoids a matrix inversion by including a recursive loop.

10. The method of claim 1, further comprising performing temperature compensation to the normalized value.

11. A spectral determination system, comprising:

a plurality of illuminants;

at least one photodetector that detects light originating from the plurality of illuminants and reflected by a target; and a controller that:

normalizes a plurality of illuminant sensor outputs obtained from the at least one photodetector, each illuminant sensor output corresponding to a respective one of the plurality of illuminants and indicating an actual reflectance value obtained from the target at a particular wavelength of light;

obtains reference data from a reference database that correlates Karhunen-Loeve coefficients of reference spectra with a corresponding plurality of normalized illuminant sensor outputs for reference colors, the reference data including data in a neighborhood of each reflectance value; and determines a spectrum $\hat{S}$ based on the illuminant sensor outputs and the reference data, wherein the determining step places greater importance on the data in the neighborhood of each reflectance value.

12. The spectral determination system according to claim 11, wherein the controller performs the determining step based on basis vectors and linear operators.

13. The spectral determination system of claim 12, wherein the linear operators include a conversion matrix, and, in the determining step, the controller estimates a parameter vector $\hat{\alpha}$ by multiplying a matrix of the basis vectors by the conversion matrix and estimates the spectrum $\hat{S}$ by $$\hat{S}=\hat{\alpha}^T\varnothing,$$

where $\varnothing$ is the matrix of the basis function vectors corresponding to a Karhunen-Loeve transform of reference reflectance spectra represented by $S_1 S_2 \ldots S_N$.

14. The spectral determination system of claim 13, wherein the conversion matrix is represented by $$A^*=QP^{-1}$$

where $$Q = \sum_{i=1}^{N} w(i)\alpha_i Z_i^T \text{ and } P = \sum_{i=1}^{N} w(i) Z_i Z_i^T$$

where w(i) represents a weighting function that places greater importance on the data in the neighborhood of each actual reflectance value, N is a number of spectral samples in the reference database, $\alpha_i$ is an $i^{th}$ Karhunen-Loeve transform coefficient vector in the reference database, and $Z_i$ is an $i^{th}$ normalized illuminant sensor output in the reference database.

15. The spectral determination system of claim 14, wherein $$w(i) = \frac{1}{\|V - Z_i\|^p + \varepsilon},$$

where p is an integer number greater than or equal to 2 and $\epsilon$ is a small positive constant.

16. The spectral determination system of claim 12, wherein the linear operators include $C(i) = Z_i B(i)$ $b(i) = w(i) + C(i) Z_i^T$ $B(i+1) = B(i) - C(i)^T C(i)/b(i)$ $D(i+1) = D(i) + \alpha_i^T Z_i/w(i)$ where w(i) represents a weighting function that places greater importance on the data in the neighborhood of each actual reflectance value, $\alpha_i$ is an $i^{th}$ Karhunen-Loeve transform coefficient vector in the reference database, and $Z_i$ is an $i^{th}$ normalized illuminant sensor output in the reference database, the linear operators being recursively computed until i=N, where N is a number of spectral samples in the reference database;

wherein, in the determining step, the controller estimates a parameter vector $\hat{\alpha}$ by $\hat{\alpha} = D(N) B(N) V$ and estimates the spectra $\hat{S}$ by $\hat{S} = \hat{\alpha}^T \emptyset,$ where $\emptyset$ is a matrix of the basis function vectors corresponding to a Karhunen-Loeve transform of reference reflectance spectra represented by $S_1\ S_2\ \ldots\ S_N$.

17. The spectral determination system of claim 16, wherein $w(i) = \|V - Z_i\|^p + \epsilon$, where p is an integer number greater than or equal to 2 and $\epsilon$ is a small positive constant.

18. The spectral determination system of claim 12, wherein the determining step avoids a recursive loop by including a matrix inversion.

19. The spectral determination system of claim 12, wherein the determining step avoids a matrix inversion by including a recursive loop.

20. The spectral determination system of claim 11, further comprising performing temperature compensation to the normalized value.

21. A coloring system incorporating the spectral determination system of claim 11.

22. The coloring system of claim 21, wherein the coloring system is one of a digital photocopier and a color printer.

23. The coloring system of claim 22, wherein the coloring system is a xerographic color printer.

24. The coloring system of claim 22, wherein the coloring system is an ink-jet printer.

25. A color detection system incorporating the spectral determination system of claim 11.

26. A storage medium on which is recorded a program for implementing the method of claim 1.

* * * * *